United States Patent [19]

Gill et al.

[11] Patent Number: 4,878,140
[45] Date of Patent: Oct. 31, 1989

[54] MAGNETO-RESISTIVE SENSOR WITH OPPOSING CURRENTS FOR READING PERPENDICULARLY RECORDED MEDIA

[75] Inventors: Hardayal S. Gill, Los Altos; Victor W. Hesterman, Los Altos Hills; Giora J. Tarnopolsky, Palo Alto; Lung T. Tran, San Jose, all of Calif.

[73] Assignee: Hewlett-Packard Company, Palo Alto, Calif.

[21] Appl. No.: 209,651

[22] Filed: Jun. 21, 1988

[51] Int. Cl.⁴ .................................................. G11B 5/39
[52] U.S. Cl. ........................................................ 360/113
[58] Field of Search ........................................... 360/113

[56] References Cited

U.S. PATENT DOCUMENTS

| | | | |
|---|---|---|---|
| 3,860,965 | 1/1975 | Voegeli | 360/113 |
| 4,179,720 | 12/1979 | Miura | 360/113 |
| 4,306,215 | 12/1981 | Jeffers | 360/113 |
| 4,356,523 | 10/1982 | Yeh | 360/113 |
| 4,447,839 | 5/1984 | Desserre | 360/113 |
| 4,589,041 | 5/1986 | Voegeli | 360/113 |

*Primary Examiner*—Robert S. Tupper
*Attorney, Agent, or Firm*—William H. F. Howard

[57] ABSTRACT

A sensor for reading perpendicularly recorded media includes dual magneto-resistive elements. Directionally opposed currents through respective elements each serve both sensing and bias functions. A detector differentially detects changes in the resistance of the stripes so as to presume common mode noise rejection when reading perpendicular recording media. In addition, the opposing currents offset each other's interaction with the soft magnetic underlayer of the media, which interaction could otherwise perturb the information stored on the media. Provision is made for switching the relative direction of current flow to provide for reading longitudinally recorded media.

10 Claims, 2 Drawing Sheets

FIG._1.

MAGNETO-RESISTIVE SENSOR WITH OPPOSING CURRENTS FOR READING PERPENDICULARLY RECORDED MEDIA

BACKGROUND OF THE INVENTION

The present invention relates to magnetic recording and, more particularly, to a magneto-resistive sensor for reading perpendicularly recorded magnetic media and a system incorporating the same.

Magnetic media in the form of tapes, strips, floppy disks and hard disks are widely used for information storage. Information is recorded by imposing one of two opposing magnetic spin orientations on each of many magnetic domains. In longitudinal recording, the opposing spin orientations are aligned with the plane of the medium, whereas in perpendicular recording the opposing spin orientations are perpendicular to the plane of the medium. As a result, the fields at the media surface above a transition are unipolar in the case of longitudinally recorded media and bipolar in the case of perpendicularly recorded media.

Longitudinal recording has been the easier format to implement and thus is far more prevalent. Perpendicular recording inherently permits greater recording densities and thus is presently subject to intense research and development efforts. To date, however, more is known about optimizing read devices for longitudinal recording. Accordingly, read sensors for longitudinally recorded media have tended to anticipate read sensors for perpendicularly recorded media.

Widely prevalent inductive write heads include elements which can also serve for reading media inductively. Inductive reading is passive in that the unamplified signal output of an inductive sensor derives its energy from the flux levels as well as the rate of change of flux transitions in the medium being read. Consequently, the sensitivity of read sensors is limited by the flux generated by the medium at the sensor. Therefore, inductive read sensors have failed to provide the sensitivity required by the most dense storage media, which tend to provide less flux per unit of stored information.

Active read sensors have been developed in which sensitivity is a function of a sense current and not only of flux strength. Such sensors, which use magneto-resistive elements, can provide greater sensitivity than inductive sensors and so have extended the range of storage densities that can be read reliably. Magneto-resistive sensors have been disclosed for both longitudinally recorded media and for perpendicularly recorded media, for example, in U.S. Pat. No. 4,654,739 to Takahaski et al. A basic magneto-resistive sensor includes a stripe of magnetic material with longitudinal and transverse axis. The stripe is magnetized along the longitudinal, or "easy" axis, which can coincide with the direction for the sense current. The resistance of the stripe can be changed by applying a magnetic field to the stripe so as to rotate its magnetization.

In the absence of a magnetic field, the resistance of the stripe is at a maximum and does not change sensitively in response to magnetic flux changes. Accordingly, the sensor is typically biased by a magnetic field oriented along the "hard" or transverse axis of the stripe. This bias field can be generated by a bias current through a conductor arranged parallel to the magneto-resistive stripe. Preferably, the magnetic bias yields a net magnetization at roughly 45° to both the hard and easy axes. With the magnetization of the stripe so biased, the stripe resistance changes with optimum sensitivity, and linearly, to changes in magnetic flux along the hard axis.

Accordingly, stored information can be read by detecting changes in voltage drops across a magneto-resistive stripe as the medium containing the information is moved relative to the stripe. An advantage of magnetoresistive sensors over inductive sensors is that the sensitivity of the former can be enhanced by increasing the sense current through the stripe. However, there are practical limits on the current which can be supplied through a single stripe. One cannot improve sensitivity by reducing the resistance of the stripe, since that is the variable of interest. One can increase the power supplied to the stripe, but thermal buildup due to heat dissipation in the stripe can disturb the read process and even damage the read head.

The current limitation on single element magneto-resistive sensors has been successfully addressed for longitudinally recorded media by providing co-directional currents through parallel magneto-resistive stripes. A certain design efficiency is attainable using dual magneto-resistive sensors since the sense current for each stripe can serve as the bias current for the other stripe; this eliminates the need for a separate conductor for a bias current. In addition, the voltage outputs of the stripes can be combined differentially to implement common mode rejection of perturbances such as thermal noise.

While other magneto-resistive sensor configurations have been developed successfully the advantages of dual magneto-resistive sensors using parallel currents for reading longitudinally recorded media suggest the use of such sensors for reading perpendicularly recorded media. However, there are significant differences between the media used for perpendicular recording and the media used for longitudinal recording that complicate the use of active sensors, such as single and dual stripe magneto-resistive sensors.

A layer of "hard" or relatively high-coercivity magnetic material is used as information storage media in both formats. A typical perpendicular recording medium employs a "soft" or relatively low-coercivity magnetic underlayer to write the perpendicular orientation of the domains in the hard magnetic layer. This underlayer can amplify magnetic fields induced by currents through active read sensors. These amplified fields can be large enough so that the read process can alter and erase data during the read process. This problem, which occurs with single element magnetoresistive sensors, can be exacerbated when the larger currents available using dual sensors are applied.

Without addressing this problem of using current-bearing sensors with perpendicular media, U.S. Pat. No. 4,589,041 to Voegeli discloses a read sensor for perpendicular recording media (referred to therein as "vertical" recording media) with dual magneto-resistive stripes and co-directional currents. In the disclosed sensor, the stripes are connected electrically in parallel between two terminals. The stripes are spaced apart at a distance which is small relative to the density of the stored data to be sensed. The stripes are mutually biased in opposite directions near respective inflection points in their respective resistance versus magnetic field curves. This is accomplished by current from a constant source attached to a common terminal.

Voegeli's sensor is subject to the read perturbances that generally apply to active read sensors for perpendicularly recorded media. Voegeli neither addresses nor solves the problems caused by these perturbances. In addition, since the stripes are connected "internally", it is difficult to monitor the currents through the individual stripes to ensure that the currents are equal. Unequal currents result in different sensitivities due to different sense currents and bias fields of different strengths. Even were inequalities detectable, there is no provision for balancing the currents.

Consequently, to operate each stripe with optimal sensitivity and linearity requires that the resistances of the stripes be carefully matched across the range of expected read signal flux strengths and operating temperatures. This imposes strict processing constraints on the sensor during fabrication adding to its cost. Furthermore, no provision is made for current inequalities due to device aging.

Thus, heretofore, read sensors for perpendicularly recorded media have been limited to passive inductive sensors with relatively limited sensitivity and active devices with greater sensitivity but which can disturb recorded information during a read operation. What is needed is an active read sensor which minimizes the disturbances at a perpendicularly recorded medium. Preferably, the read sensor would be adaptable for reading longitudinally recorded media as well as perpendicularly recorded media to enhance the operational flexibility of an incorporating information retrieval system.

SUMMARY OF THE INVENTION

The present invention provides a dual-element magnetic-resistive read sensor through which currents flow in opposing direction, i.e., the currents are directionally opposed. A detector provides an output signal corresponding to the difference in voltage changes undergone by the elements, or stripes, when a magnetic transition is encountered in the medium. The output signal is related to the difference of the magnetic excitation fields perceived by each of the two stripes. Depending on the arrangement of the stripes and the detector, the detector can include a differential or a summing amplifier. A mode for reading longitudinally recorded media can be provided by allowing the relative current direction to be switched, changing the arithmetic function applied by the detector so that its output still reflects the instantaneous difference in changes in resistance between the stripes.

The current through each stripe can be monitored and regulated. In some embodiments of the present invention, currents through the stripes can be balanced by regulating them independently to a common value. In an alternative embodiment of the present invention, the stripes are arranged in series so that the currents through the stripes are equal because they are simply different segments of a single current.

The resistance of each stripe contributes independently to the overall sensitivity of the incorporating sensor so that, in contrast to Voegeli's sensor, the full available sensitivity is realized. Also in contrast to Voegeli's sensor, there is no problem balancing currents, either because the stripes are in series in because the currents can be regulated independently. Moreover, and in contrast to single stripe magneto-resistive sensor and Voegeli's dual stripe sensor with parallel currents, the interaction of each current with the soft magnetic underlayer of a perpendicularly recorded media is largely offset by the action of the opposing current. Thus, disturbance of information during read operations is minimized. Furthermore, the present sensor can be switchable between modes for reading both perpendicular recorded information and longitudinally recorded media. Other features and advantages of the present invention are apparent from the description below with reference to the following drawings.

DESCRIPTION OF THE PREFERRED EMBODIMENTS

Figure 1:
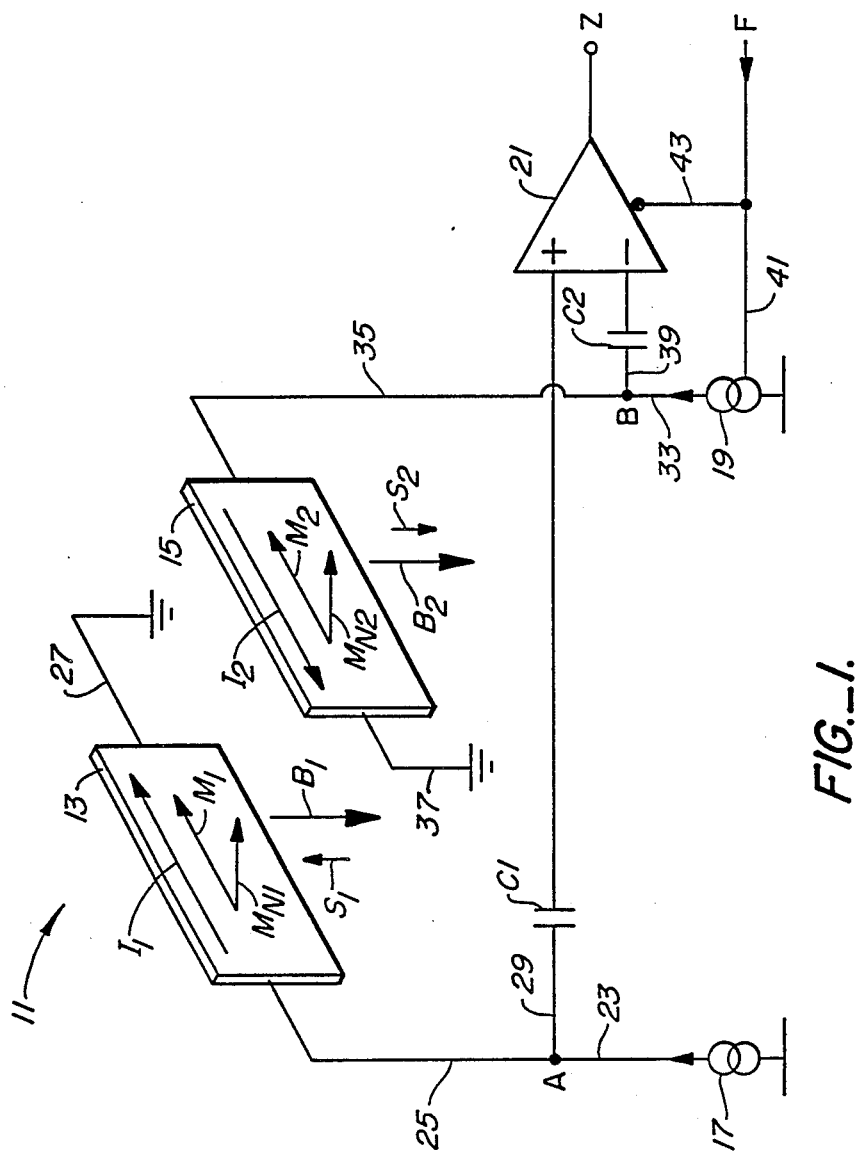
FIG. 1 is a sensor for reading magnetic media in accordance with the present invention.

In accordance with the present invention, a read sensor 11 includes a first magneto-resistive element 13, a second magneto-resistive element 15, a first current source 17, a second current source 19, and a differential amplifier 21. Current source 17 provides a current $I_1$ through stripe 13 and current source 19 provides a current $I_2$ through stripe 15. Stripes 13 and 15 are parallel. The direction of current $I_1$ through stripe 13 is opposed to the direction of $I_2$ through stripe 15. As the terms are used herein, "parallel" vector parameters can be either "co-directional" or "directionally opposed".

Current $I_1$ flows from current source 17, along a path 23 to a node A, from node A along a path 25 to stripe 13, through stripe 13, and from stripe 13 along a path 27 to ground. Since $I_1$ is constant, the voltage at node A is positive and its magnitude depends on the instantaneous resistance of stripe 13. Likewise, current $I_2$ flows from current source 19, along a path 33 to a node B, from node B along a path 35 to magnetoresistive stripe 15, through stripe 15, and from stripe 15 along a path 37 to ground. The voltage at node B is a positive variable the magnitude of which depends on the instantaneous resistance of stripe 15.

Node A is AC-coupled through capacitor C1 to the "+" input of differential amplifier 21 via path 29 and node B is AC-coupled through capacitor C2 to the "−" input of differential amplifier 21 via path 39. Consequently, the output of differential amplifier 21 is the potential difference between node A and node B which in turn represents the difference in the voltage drops across stripes 13 and 15. This corresponds to the different in resistance between stripes 13 and 15.

In the absence of a bias field, stripe 13 has an initial magnetization $M_1$ along its easy axis and parallel with current $I_1$ through stripe 13. Correspondingly, stripe 15 has an initial magnetization $M_2$ along its easy axis and parallel to the direction of current $I_2$. Current $I_1$ produces a bias field $B_2$ at stripe 15 orthogonal to $M_2$ resulting in a net magnetization $M_{N2}$ at about 45° from both $M_2$ and $B_2$. Likewise, current $I_2$ produces a bias field $B_1$ at stripe 13 orthogonal to $M_1$ resulting in a net magnetization $M_{N1}$ at about 45° from both $M_1$ and $B_1$. Since currents $I_1$ and $I_2$ are opposed, bias fields $B_1$ and $B_2$ are co-directional.

The instantaneous magnetization of stripe 13 is $M_{N1}$ plus the instantaneous signal field $S_1$, shown pointing up in FIG. 1. The instantaneous magnetization of stripe 15 is $M_{N2}$ plus the instantaneous signal field $S_2$, shown pointing down in FIG. 1. The fact that $S_1$ and $S_2$ are opposed is indicative that a transition is being detected.

Figure 2:
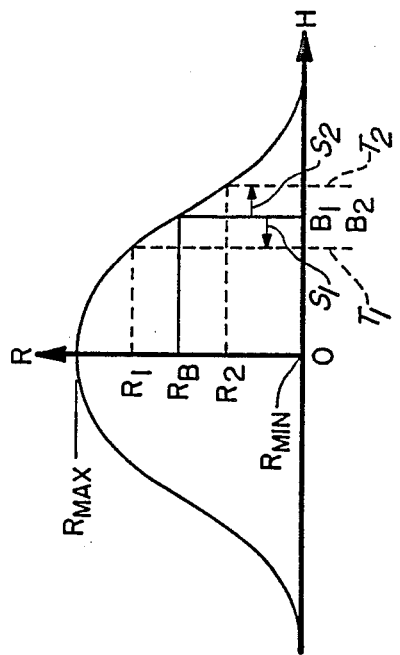
FIG. 2 is a graph showing the response of the sensor of FIG. 1 to signal fields of opposite polarity.

FIG. 2 is a graph of resistance R plotted against magnetic field strength H taken perpendicular to $M_1$ and $M_2$. The maximum resistance $R_{MAX}$ occurs when the net magnetization is along the easy axis of the respective stripe, i.e., along $M_1$ or $M_2$. Minimum resistance $R_{MIN}$ occurs with the magnetization oriented along the hard axis of the respective stripe. When the bias fields $B_1$ and $B_2$ are applied to both stripes 13 and 15 are characterized by the same net resistance $R_B$. Signal field $S_1$ is vectorially added to bias field $B_1$ to yield a field T1 orthogonal to $M_1$ which results in a resistance $R_1$ for stripe 13. Likewise, $S_2$ is vectorially added to yield field T2 which results in a resistance $R_2$ for stripe 15. The relations between the resistance can be expressed as: $R_1 - R_B = R_B - R_2 = \Delta R$. The output Z of amplifier 21 is proportional to $R_1 - R_2$ and is indicative of the strength of the flux transition in the media causing opposing fields $S_1$ and $S_2$.

In the absence of bias and signal fields, the magnetization for each stripe is its initial magnetization, $M_1$ or $M_2$, and resistance is at a $R_{MAX}$. Visual inspection of FIG. 2 indicates that resistance does not vary sensitively with magnetic field in the absence of bias. With the bias fields $B_1$ and $B_2$ applied, the magnetization rotates, and the stripes' resistances change to $R_B$ about which resistance varies most sensitively with the signal fields $S_1$ and $S_2$.

In the absence of a signal field, the resistances of stripes 13 and 15 are equal to $R_B$ and thus to each other. Thus the output of differential amplifier 21 is zero in the absence of a signal field. When oriented as depicted in FIG. 1, the effects of $S_1$ and $S_2$ are as indicated in FIG. 2: opposed signal fields $S_1$ and $S_2$ have opposing effects on the resistances of the respective stripes 13 and 15. $S_1$ increases the resistance of stripe 13 by $\Delta R$ while $S_2$ diminishes the resistances of stripe 15 by $\Delta R$. The transition represented by the opposing signal fields $S_1$ and $S_2$ is thus reflected by an output corresponding to a difference of twice $\Delta R$.

Away from a transition, $S_1$ and $S_2$ are co-directional so that stripes 13 and 15 undergo equivalent changes in resistance. For example, if $S_2$ in FIG. 1 is inverted to be co-directional with $S_1$, the resistances of both stripes are increased equally. In other words, $S_1 = S_2$ implies $R_1 = R_2$. In this situation, and any other in which $S_1$ and $S_2$ are equal and co-directional, the output Z of differential amplifier 21 is zero. Thus, differential amplifier 21 provides a zero output in the absence of signal fields and in the presence of equal and co-directional signal fields. Differential amplifier 21 provides a non-zero output Z during a transition when $S_1$ and $S_2$ are opposed, the sign of the output corresponding to the direction of the transition. Accordingly, the output Z of differential amplifier 21 is a read out of information stored as transitions in a perpendicularly recorded medium.

Some capability for reading longitudinal media is provided in that current source 19 is switchable in response to a format a signal F along path 41 so that current $I_2$ can be reversed. The format signal F is also directed to differential amplifier 21 along path 43. Format signal F switches differential amplifier 21 so that the input at its "—" input is inverted. In this mode, amplifier 21 acts as a summing amplifier. In this configuration, sensor 11 can read longitudinally recorded media.

When sensor 11 is configured as described for longitudinally recorded media, bias field $B_1$ is inverted and $M_{N1}$ is 45° up rather than down from $M_1$. In the absence of a signal field, the voltage at note A is the inverse of the voltage at node B. Since the signal at the "—" input of amplifier 21 is inverted, the output from amplifier 21 is zero. With $S_1$ and $S_2$ both down, as might occur when a logic high is being read, the voltage at node A is a positive signal over a positive quiescent voltage, and the voltage at node B is a positive signal over a negative quiescent voltage. Thus, the output of amplifier 21 is high. With $S_1$ and $S_2$ both up, as might occur when a logic low is being read, the output of amplifier 21 is low.

In the preferred embodiment, the spacing of stripes 13 and 15 is fixed and optimized for perpendicularly recorded media. This spacing is selected to correspond to resolution and output required to read the perpendicularly recorded media of interest. In general, this spacing is greater than the spacing used in dual magnetoresistive read sensors dedicated to longitudinal recording.

In sensor 11, the currents through stripes 13 and 15 can be balanced by monitoring and controlling current sources 17 and 19. In an alternative perpendicular recording sensor 51 of FIG. 3, currents are inherently equal because stripes 53 and 55 are arranged in series with a single current source 57. A detector 61 combines voltages generated across stripes 53 and 55 as described below.

Current flows from source 57 along path 63 to node C, along path 65 to stripe 53, across stripe 53, along path 67 to node D, along path 69 to stripe 55, across stripe 55, along path 71 to node E and along path 73 to ground. The currents $I_1$ and $I_2$ through stripes 53 and 55 induce co-directional bias fields $B_2$ and $B_2$ to bias initial magnetizations $M_2$ and $M_1$ to net magnetizations $M_{N2}$ and $M_{N1}$ respectively. The effects of opposing signal fields $S_1$ and $S_2$, as in the case of the embodiment of FIG. 1, are indicated in FIG. 2.

Where the arithmetic function provided by detector 61 can be expressed as $Z = (A2 - A1) - (A1 - A3)$, where Z is the output and A1, A2 and A3 are the inputs to detector 61, then $Z = (V_c - V_d) - (V_d - V_c)$, where $V_c$ is the voltage at node C, $V_d$ is the voltage at node D, and $V_e$ is the voltage at node E. This arithmetic function can be implemented using two differential amplifiers to provide inputs to a third differential amplifier. Output A1 is electrically connected to node D through a resistor 81, output A2 is electrically connected to node C through a resistor 82 and output A3 is electrically connected to node E through a resistor 83. The resistors are selected to provide essentially infinite impedance to the current while allowing the voltages at nodes C, D and E to be input to detector 61. Since node E is at ground, the output of detector 61 can be expressed more simply as $Z = V_c - 2V_d$. This output is suitable for reading perpendicularly recorded media.

Figure 3:
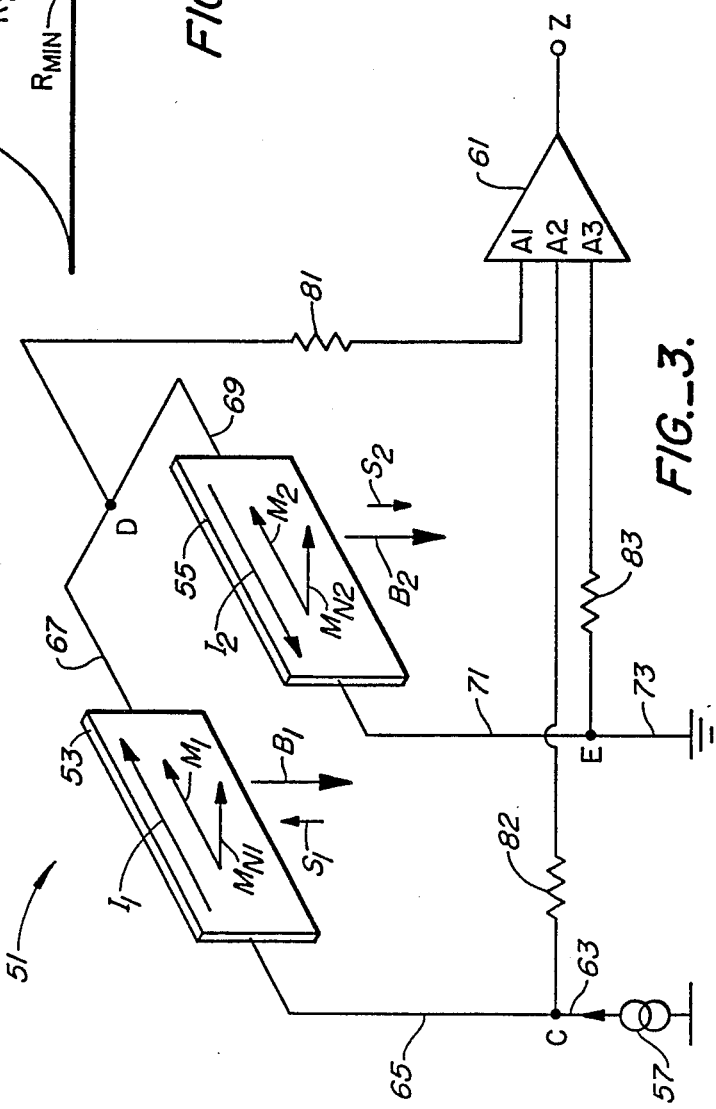
FIG. 3 is another sensor for reading magnetic media in accordance with the present invention.

The embodiment of FIG. 3 can be readily modified to provide a third perpendicular recording sensor in accordance with the present invention. In this embodiment, node E is tied to a current source opposed to current source 57 and node D is tied to ground. The detector is configured as a summing amplifier to provide an output $Z = A2 + A3$. As in the embodiment of FIG. 1, including means for inverting one of the current sources and reconfiguring the detector as a differential amplifier renders the resulting sensor adaptable for reading longitudinally recorded media as well as perpendicularly recorded media.

The foregoing disclosure illustrates a few of the embodiments of the present invention. Different numbers of stripes, different sensor element geometries, spacings, currents, detectors and current sources are also viable. These and other variations upon and modifications to the described embodiments are provided by the present invention, the scope of which is limited only by the following claims.

What is claimed is:

1. A device comprising:
   a first magneto-resistive element having a first magnetization;
   a second magneto-resistive element having a second magnetization, said second magnetization being parallel to said first magnetization;
   current means for supplying a first current through said first magneto-resistive element and a second current through said second magneto-resistive element, said first and second currents being parallel and directionally opposed, said first and second magneto-resistive elements being spaced so that said first current produces a first bias field orthogonal to said second magnetization at said second magneto-resistive element and so that said second current produces a second bias field orthogonal to said first magnetization at said first magneto-resistive element, said first and second bias fields being parallel and co-directional; and
   detector means for detecting differential changes in resistance between said magneto-resistive elements, said detector means being coupled to each of said magneto-resistive elements.

2. The device of claim 1 wherein said first and second magnetoresistive elements are in series electrically.

3. The device of claim 1 wherein further comprising reversing means for reversing the relative current directions through said magnetoresistive elements.

4. The device of claim 1 further comprising switching means for switching said detector means so that it detects the sum of the changes in resistance between said magneto-resistive elements when said currents are co-directional.

5. A system comprising:
   a read head including first and second magneto-resistive elements, current means and detector means, said first magneto-resistive element having a first magnetization, said second magneto-resistive element having a second magnetization, said second magnetization being parallel to said first magnetization, said current means supplying a first current through said first magneto-resistive element and a second current through said second magneto-resistive element, said first and second currents being directionally opposed, said first and second magneto-resistive elements being spaced so that said first current produces a first bias field orthogonal to said second magnetization at said second magneto-resistive element and so that said second current produces a second bias field orthogonal to said first magnetization at said first magneto-resistive element, said first and second bias fields being parallel and co-directional, said detector means providing an output corresponding to the difference in changes of resistance between said elements;
   a perpendicular recording medium including information stored thereon in the form of magnetic transitions; and
   drive means for moving said medium by said head so that said magnetic transitions can affect the combined resistance of said magnetoresistive elements.

6. The system of claim 5 wherein said medium is arranged so that the fields induced by it at said magneto-resistive elements are orthogonal to said first and second magnetizations.

7. The device of claim 5 further comprising means for reversing the relative direction of current through at least one of said magnetoresistive elements.

8. The device of claim 7 further comprising means for switching said detector means so that its output corresponds to the difference between the changes in resistance of said magneto-resistive elements both when said currents are co-directional and when said currents are opposed.

9. The device of claim 5 wherein said first and second magnetoresistive elements are in series so that said first and second currents are equal.

10. A sensor for reading perpendicularly recorded media, said sensor comprising:
    a first magneto-resistive element for responding to the magnetic field at a first location, said first magneto-resistive element having a first magnetization;
    a second magneto-resistive for responding to the magnetic field at a second location, said second magneto-resistive element having a second magnetization, said second magneto-resistive element being spaced from and parallel to said first magneto-resistive element, said second magnetization being parallel to said first magnetization;
    current means for supplying a first current through said first magneto-resistive element and a second current through said second magneto-resistive element, said first and second currents being parallel and directionally opposed so that said first current produces a first bias field orthogonal to said second magnetization at said second magneto-resistive element and so that said second current produces a second bias field orthogonal to said first magnetization at said first magneto-resistive element, said first and second bias fields being parallel and co-directional; and
    detector means for detecting differential changes in resistance between said magneto-resistive elements, said detector means being coupled to each of said magneto-resistive elements;
    whereby spatial magnetic transitions in perpendicular recorded media are represented by the output of said detector means.

* * * * *